UNITED STATES PATENT OFFICE.

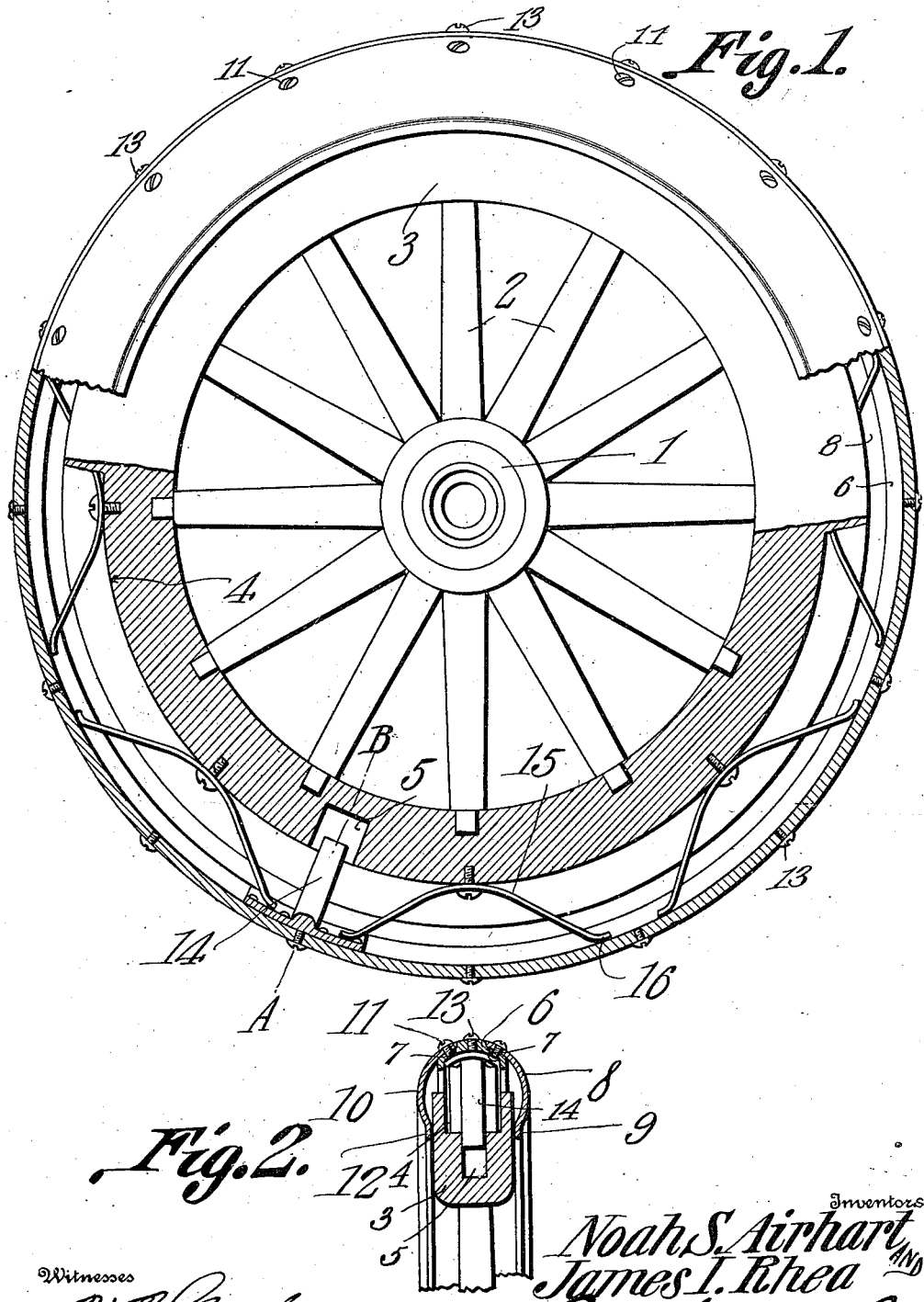

NOAH S. AIRHART AND JAMES I. RHEA, OF TRENTON, MISSOURI.

VEHICLE-WHEEL.

989,750.  Specification of Letters Patent.  Patented Apr. 18, 1911.

Application filed January 24, 1910. Serial No. 539,749.

*To all whom it may concern:*

Be it known that we, NOAH S. AIRHART and JAMES I. RHEA, citizens of the United States, residing at Trenton, in the county of Grundy and State of Missouri, have invented a new and useful Vehicle-Wheel, of which the following is a specification.

This invention relates to vehicle wheels of that type particularly designed for use upon motor vehicles and the principal object of the invention is to provide a wheel of this character having a metallic tread portion yieldingly held normally in a predetermined position relative to the hub of the wheel, the tread being so constructed as to be readily placed in or removed from position upon the wheel.

Another object is to provide simple means whereby the tread can be prevented from shifting longitudinally upon the wheel, the centering springs being secured solely to the wheel rim and bearing loosely upon the tread portion.

With these and other objects in view the invention consists in certain novel details of construction and combinations of parts hereinafter more fully described and pointed out in the claim.

In the accompanying drawings the preferred form of the invention has been shown.

In said drawings:—Figure 1 is a view partly in side elevation and partly in section of a wheel embodying the present improvements. Fig. 2 is a section on line A—B, Fig. 1.

Referring to the figures by characters of reference 1 designates the hub of the wheel, the same being connected by spokes 2 with the rim 3 which rim is provided, in its outer face, with an annular channel 4 having an elongated socket 5 located at a suitable point in the inner wall thereof. A transversely arched metallic hoop 6 extends around the wheel rim and constitutes the tread portion of the wheel, there being rabbets 7 formed within the outer face of said tread portion and adjacent to the side edges thereof. Seated within one of these rabbets is the outer edge portion of a guard ring 8 which is riveted or otherwise secured to the tread portion 6, this guard ring being bowed transversely and provided along its inner edge with a flange 9 lying parallel with the adjoining side face of the rim 3. Another guard ring 10, similar to the ring 8, is seated at its outer edge within the other rabbet 7 and may be detachably secured therein in any desired manner, as by means of screws 11.

The inwardly extending flange 12 formed upon the inner edge portion of the ring 10 lies parallel with the flange 9, the distance between these two flanges being substantially equal to the thickness of the wheel rim 3. Screws 13 are preferably secured within the tread portion 6 at desired intervals and along the longitudinal center thereof, these screws and the heads of the rivets and screws heretofore referred to constituting anti-skidding devices and also serving to prevent the wheel from slipping longitudinally upon ice, mud, etc. A stud 14 is secured to the inner face of the tread portion 6 and is so located as to project into the socket or recess 5 so as to prevent the tread from shifting longitudinally to any considerable extent relative to the wheel rim.

Bow springs 15 are secured at their centers to the inner wall of the channel 4 in rim 3, these springs being preferably spaced apart at regular intervals and the ends of the springs being out-turned as shown at 16 and bearing against the inner surface of the tread portion 6. These springs are all of the same size and strength and therefore maintain the tread portion 6 normally concentric with the rim 3.

In assembling the parts herein described the ring 10 is detached from the tread portion 6 and the springs 15 are secured within the channel 4 in the manner shown. The tread portion 6 is then placed around the rim and in position upon the terminals of the springs, a stud 14 being projected into the recess or socket 5. The said springs will therefore hold the ring concentric with the rim. The ring 10 can then be replaced upon the tread portion and the two rings 8 and 10 will therefore hold the said tread portion against lateral displacement relative to the rim. These rings will also prevent dust, etc., from becoming lodged between the rim and the tread portion and thus interfering with the operation of the movable tread.

Obviously when the wheel travels over an uneven surface the rim or tread portion 6 will shift radially relative to the body portion of the wheel and the springs 15 will thus flex and absorb the jolts produced, so that the wheel will travel as smoothly as the ordinary types of wheels utilizing pneumatic tires.

The present device is advantageous because it is formed of but few parts all of which are readily accessible and none of which will get out of order as the result of ordinary usage.

Various changes can of course be made in the construction and arrangement of the parts without departing from the spirit or sacrificing any of the advantages of the invention as defined in the appended claim.

What is claimed is:—

A wheel, including a rim having a longitudinal channel, there being a recess opening into the channel, bow springs secured at intermediate points to the rim and within the channel, a transversely bowed ring extending around the rim and having longitudinal rabbets along the edges thereof, said ring bearing inwardly against the terminals of the springs, holding means rigidly connected to the ring and projecting loosely into the recess in the rim, and transversely bowed guard plates secured within the rabbets and lapping the sides of the rim, said plates having their outer faces flush with the outer face of the ring therebetween.

In testimony that we claim the foregoing as our own, we have hereto affixed our signatures in the presence of two witnesses.

NOAH S. AIRHART.
JAMES I. RHEA.

Witnesses:
O. G. WILLIAMS,
WILLIAM V. MASS.

Copies of this patent may be obtained for five cents each, by addressing the "Commissioner of Patents, Washington, D. C."